United States Patent [19]

Cantrell

[11] Patent Number: 4,773,261
[45] Date of Patent: Sep. 27, 1988

[54] TEST STAND AND METHOD OF TESTING THE TRACKING CHARACTERISTICS OF A CRAWLER TRACTOR

[75] Inventor: David N. Cantrell, Dubuque, Iowa

[73] Assignee: Deere & Company, Moline, Ill.

[21] Appl. No.: 928,490

[22] Filed: Nov. 10, 1986

[51] Int. Cl.⁴ .......................................... G01M 15/00
[52] U.S. Cl. ................................ 73/118.1; 73/862.09
[58] Field of Search ........... 180/6.2; 73/118.1, 862.09, 73/117; 324/161

[56] References Cited

U.S. PATENT DOCUMENTS 3,020,753 2/1962 Maxwell ............................. 73/117

4,092,855 6/1978 Kinney ............................. 73/862.09

Primary Examiner—Jerry W. Myracle

[57] ABSTRACT

A test structure and a method for measuring speeds of rotary drive members on opposite sides of a track laying tractor so as to correct potential mis-tracking on the tractor. The test structure includes a mechanical drive simulating ground coupling between tracks in a tractor. Provided in the drive is a variable resistance that simulates the load on the tractor due to its own weight and characteristics. Readings of the speeds of the rotary drive member are made to determine whether the difference between the speeds fall within or outside of acceptable limits.

6 Claims, 3 Drawing Sheets

TEST STAND AND METHOD OF TESTING THE TRACKING CHARACTERISTICS OF A CRAWLER TRACTOR

BACKGROUND OF THE INVENTION

This invention relates to a test structure that is used in testing the rotational speed of each drive member on opposite sides of a crawler tractor. This invention also relates to a method of testing of the speeds of rotating drive members on the crawler tractor and for adjusting the respective speeds.

In many crawler type tractors there are provided independent transmissions that drive the respective drive sprockets for the tracks on the tractor. In such arrangements, there is normally a single control for determining the engine speed. The problem that exists is that, the respective transmissions may create small variations in speed of the drive sprockets for the tracks. Thus, one side of the tractor will move at a different rate, even though a slight amount, than the other side of the tractor. For example, if the right drive sprocket is going faster, then the unit will move or mis-track to the left over a distance, conversely, if the left rack is going faster the unit will mis-track or move to the right. There are normally provided in the respective transmissions adjustments for providing small increases or decreases of speed which eventually is translated to the respective sprockets.

In many such crawler tractors, the manufacturer sets up certain limits or standards that each tractor may mis-track. For example, a manufacturer may limit the amount of mis-tracking to two feet in a one hundred foot distance. Heretofore, it has been necessary to drive the tractor over this distance and determine whether a mis-track outside this limit was occurring. This was not only time consuming and expensive, there were also questions concerning the accuracy of such systems.

With the above in mind, it is a primary purpose of the present invention to provide a test fixture which will measure the potential mis-tracking on a crawler tractor. It is also a purpose of the present invention to provide a method of testing, recording and correcting the speed of the crawler tractor drive sprockets so that the difference in speed between them fall within acceptable limits.

It is a further purpose of the present invention to utilize a system for determining the speed of the sprockets or their rotary drive members on a tractor in which each sprocket or rotary dive member is driven by its own transmission. The transmission is a hydrostatic drive that includes a pump and a motor with the pump driving the motor and the motor driving a shaft that through suitable drive means rotates the drive sprocket. There are adjustments in both the pump and motor in each transmission to adjust the speed of the sprocket.

In actual operation of such a tractor, when the tractor starts at zero ground speed there is full displacement of the motor and zero displacement of the pump. As the speed increases the pump displacement increases towards its maximum. After reaching its maximum, the motor displacement decreases. Therefore, it becomes apparent that the selection of adjustment in the pump and motor of the hydraulic transmission will depend upon the ground speed of the tractor. For example, if the tractor would mis-track only at high ground speed, the motor portion of the transmission should be adjusted to eliminate this mis-tracking. Similarly should the tractor mis-track only at minor speeds, the pump portion of the transmission would be adjusted to vary the speed. It is for this reason that the present test device must be capable of determining mis-tracking at various speeds.

Also effecting mis-tracking is the "ground coupling" affect between the two tracks of a track laying tractor. It has been determined that the lesser the resistance to turning by the ground, the more mis-track will be observed. Lower resistance is generally associated with softer or looser soil. It is therefore necessary in a test fixture or stand to simulate the "ground coupling" affect. It is therefore an additional purpose of the present invention to simulate the "ground coupling" affect through a drive that includes a pair of axles or shafts that are on the stand in parallel relation to the axis of the tractor rotary drive members and which have a drive, preferably of a chain type nature between the tractor and the test axles. The inner ends of the test axles are joined by a differential type of transmission which connects to a central and singular driven shaft. The driven axles, being fully journaled, allows very minimal resistance to turning so that they simulate the potential worse ground condition for mis-tracking which is loose soil.

In actual operation the weight and the drive characteristics of the tractor affects the amount of mis-tracking. For each model or size of tractor these will vary. In order to simulate the effect of weight and tractor characteristics, the driven central shaft referred to above is connected to a dynamometer which affords load on or resistance to rotation of the driven shaft and which load or resistance may be varied in accordance with the weight and characteristics of the tractor that is being tested. Therefore, it is a further object of the present invention to simulate the weight and characteristics of the tractor through a variable resistance device, which in this particular instance is a dynamometer, to the driven shaft.

It is still a further object of the present invention to provide readout material for measuring the speed of the respective sprockets and rotary drive members so that it can be determined which of the hydraulic transmissions and which portion of the respective transmissions, i.e. the pump or the motor, should be adjusted to eliminate or lessen the mistracking of the tractor.

DESCRIPTION OF THE PREFERRED EMBODIMENT

Figure 1:
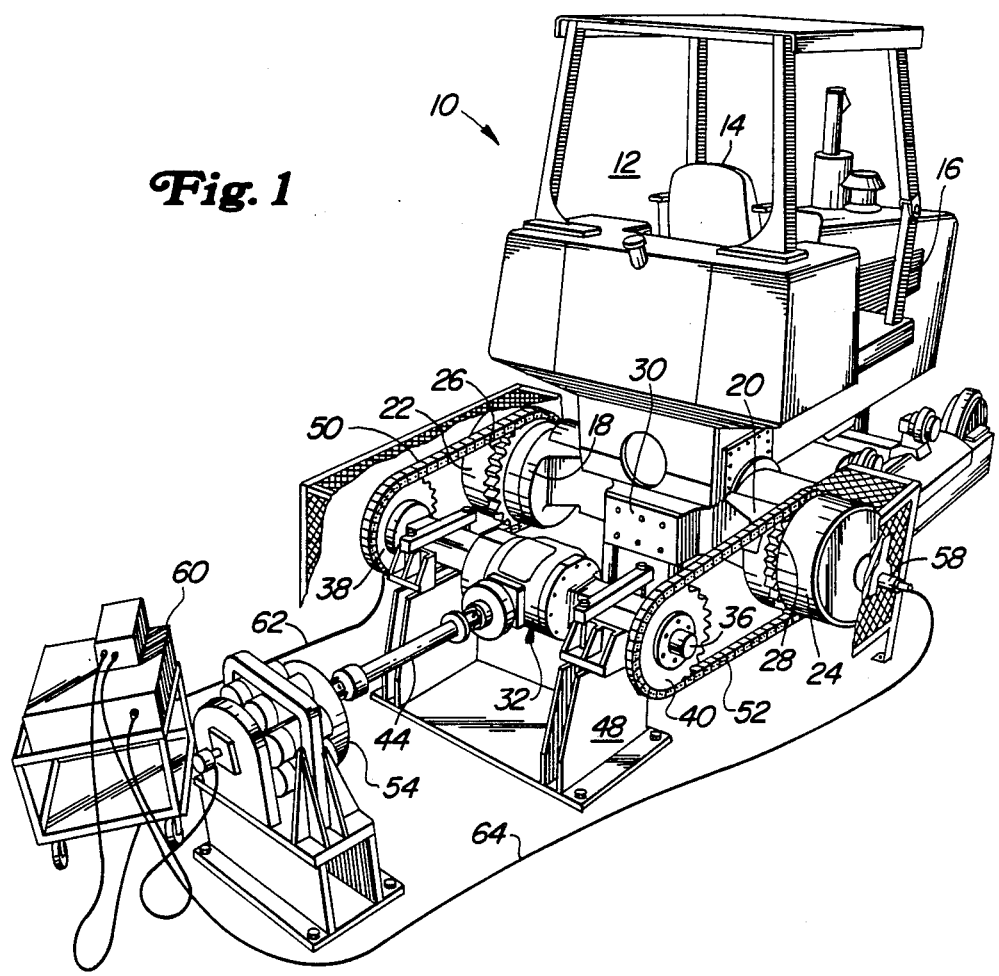
FIG. 1 is a perspective view of a tractor on the test stand of the present invention.

Referring first to FIG. 1, there is shown a partially completed tractor, that is a tractor substantially complete except for its tracks. The tractor 10 includes an operator station 12 having an operator seat 14 with suitable controls, not shown, for adjusting the speed of movement and operations of the tractor. The operator station 12 and the forward engine structure 16 are carried on a main tractor frame that includes housing structures 18, 20 that are positioned on opposite sides of the rear portion of the tractor. The housing structures carry within them various of the hydraulic components in the transmissions for the rotary drive members attached to and carried by housing structures 18, 20. Connected through final gear drives, are test drive sprockets 26, 28. The entire tractor 10 is carried on a suitable supporting structure indicated in its entirety by the reference numeral 30. As is clearly evident from reviewing FIG. 1, the supporting structure 30 not only also suspends the tractor but also the respective sprockets 26, 28.

Positioned just rearwardly of the tractor 10 is a test fixture composed of a transverse axle housing structure 32 having outwardly extending axles 34, 36 which carry sprockets 38, 40 on their outer ends, the latter being vertically coplanar with the sprockets 26, 28. The axles 34, 36 are journaled in the housing 32 in a conventional nature which offers minute resistance to rotation. The inner ends of the axles 34, 36 are connected to a differential type gear transmission 42 which connects the respective axles 34, 36 to a driven shaft 44 projecting centrally and rearwardly from the center portion of the axle structure 32. The entire axle structure 32 is suspended above the floor of the test site by a pair of transversely spaced apart stands 46, 48 which are positioned under the axle housing 32. The drive sprockets 26, 28 on the tractor are drivingly connected to the sprockets 38, 40 respectively by chains 50, 52. Reviewing the structure to this point, the axles 34, 36 are driven by the respective rotary members on sprockets 26, 28 and the respective rotary speed of the axles 34, 36 will vary in accordance with the rotary speeds of the sprockets 26, 28. Therefore, if one of the sprockets 26, 28 operates at a greater rate of rotation than the other, such will be reflected in a proportionate amount in rates of rotation of the axles 34, 36. The differential type gear transmission 42 connects the inner ends of axles 34, 36 to the output or driven outward shaft 44 and will drive the latter at a speed proportionate to the algebraic means of the speeds of the respective axles 34, 36. Therefore, any difference in speed of the drive sprockets 26, 28 are compensated for by the differential drive 42 so as to give a rate of rotation of the shaft 44 at a proportion to the speed of both sprockets 26, 28. The driven shaft 44 extends to and drives a variable load dynamometer 54 which serves to provide a load on the axles 34, 36 and from there a load on the drive sprockets 26, 28 respectively. Encoders 56, 58 are mounted on the sprockets 26, 28 or their housings 22, 24 and generate so many pulses per revolution of the respective sprockets. The pulses are fed to a computer type reader 60 through wires 62, 64. The computer 60 provides a readout for a test operator which indicates the difference in the rotary speed of the respective sprockets 26, 28.

Figure 2:
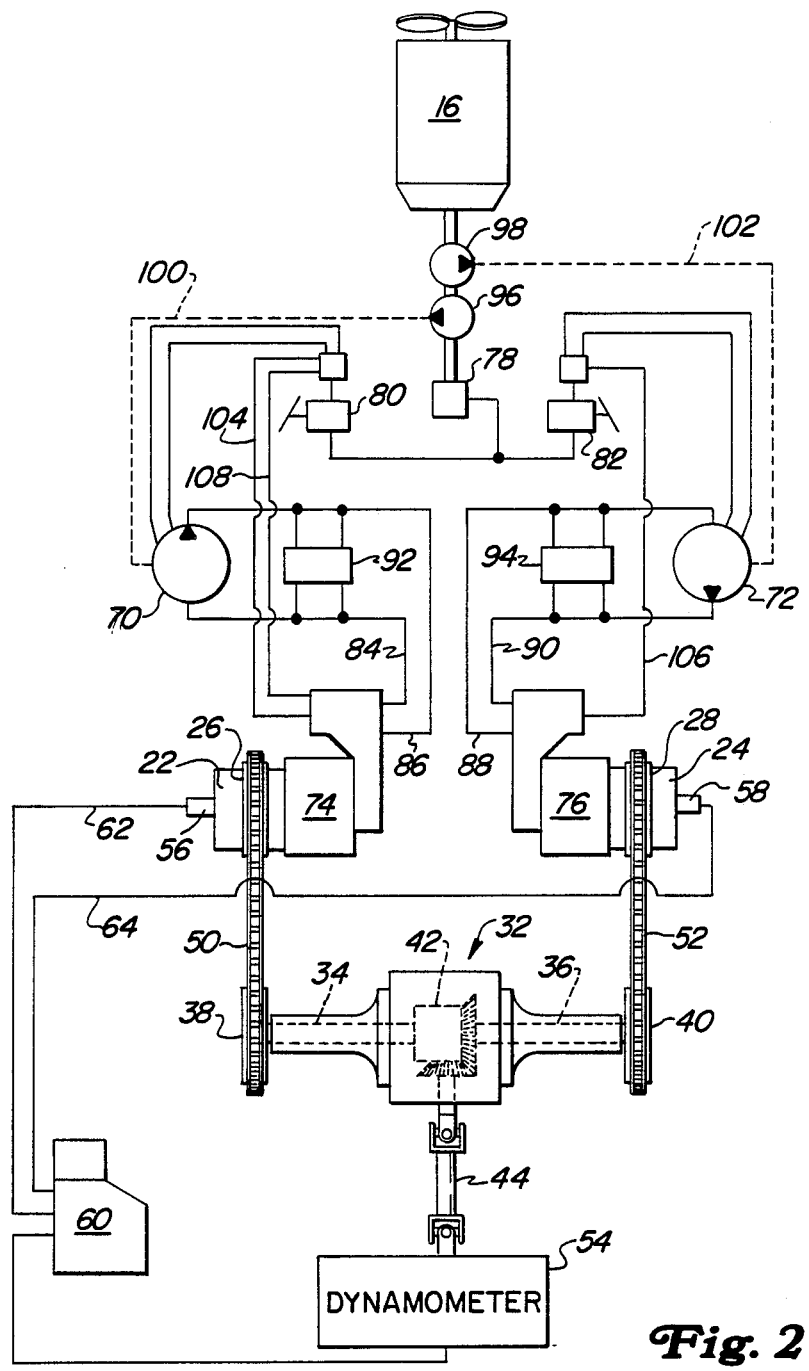
FIG. 2 is a schematic diagram of the test structure and a typical hydraulic system used on a track laying tractor with an individual hydraulic transmission for each side of the tractor.

Before discussing the operation of the entire test stand, a brief understanding of one type of transmissions and tractor drives for which such stand has been developed is in order. Such typical drives are, for example, shown and described in U.S. Pat. No. 3,988,893 which issued to Bojas et al on 2 Nov. 1976 and U.S. Pat. No. 3, 946,560 which issued to MacIntosh et al on 30 Mar. 1976. Referring now to FIG. 2, the hydrostatic transmission for this particular type of track laying tractor includes a pair of hydrostatic transmissions one to drive the left drive sprocket 26 and the other to drive the right drive sprocket 28. Each hydrostatic transmission transmits power from the engine 16 to its respective drive sprockets 26, 28. The hydrostatic transmissions include variable displacement pump units 70, 72 respectively, which are driven by the engine 16 to transmit fluid under pressure to a pair of variable displacement motor units 74, 76 respectively on the left and right side of the tractor and which are connected to the drive sprockets 26, 28 respectively.

When it is desired to move the tractor 10 along a straight path, the input and output speed ratios of the hydrostatic transmissions are simultaneously changed by equal amounts by use of a main control valve 78 through which fluid is moved under pressure to transmission steering valves 80, 82 from where the fluid is ported to left- and right-hand hydrostatic transmissions. In an ideal settings of the transmissions, fluid will be evenly divided between the transmissions and the transmissions will operate identically so that the tractor 10 would move forwardly along a straight path, i.e. with no mistracking. Assuming the tractor is moving slow, the main control valve 78 may be adjusted to increase the fluid moving through the steering valves 80, 82 to the respective pumps 70, 72 to thereby increase the effective displacement of those pump units by equal amounts and as a result increase the speeds of the respective drive sprockets 26, 28.

The respective pumps 70, 72 move fluid through lines 84, 86 and 88, 90 respectively to the motors 74, 76. Incorporated between the respective lines 84, 86 and 88, 90 are a series of pressure regulator valves indicated in their entirety by their reference numeral 92, 94, the exact details of which form no part of the present invention but if details are desired, such may be had by referring to the aforementioned patents. A pair of charge pumps 96, 98 are provided for the respective hydrostatic transmissions and are driven by the engine 16 to provide fluid through lines 100, 102 to charge the respective pumps and motors of the left and right hydrostatic transmissions.

Figure 3:
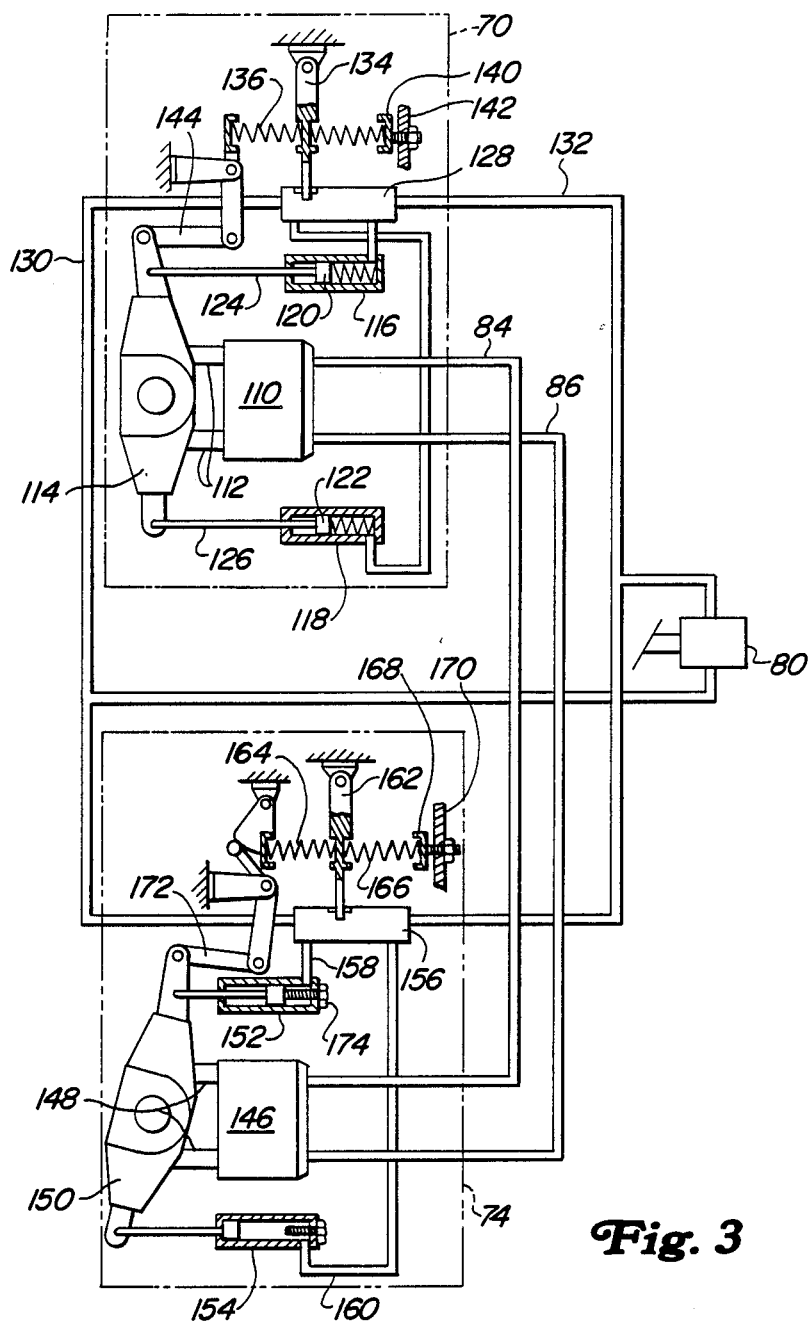
FIG. 3 is a schematic view showing parts of the pump and motor of a transmission and the adjustments that are available to adjust in small amounts the speed of the pump and/or motor.

FIG. 3 shows the control system for the pump 70 and motor 74, it being understood that an identical system is provided for pump 72 and motor 76. The pump 70 includes the pump proper 110 which is rotated by a drive shaft, not shown, but which receives power from the engine 16. Typically the pump 110 includes the rotatable cylinder block with a plurality of cylinders spaced angularly around the block and having pistons 112 extending into the cylinders. The pump 70 also has a variable swash plate 114 that is engaged by the ends of the pistons 112. A pair of control cylinders 118 are used to position the swash plate 114. The cylinders 116, 118 contains spring loaded pistons 120, 122 that have rods 124, 126 projecting out of the cylinders and connected to opposite sides of the swash plate 114. Fluid to the cylinders 116, 118 is fed through a control valve 128. The valve 128 is a spindle type valve that will shift axially within the valve housing. The position of the spool valve is controlled through lines 130 that connects to one end of the valve and 132 which connects to the opposite end of the valve. A reversing valve, not shown, is also in the system. The spool valve 128 is also partially control by a pivoted arm 134 which is connected to the spool in the valve 128 to move therewith. The arm is backed on opposite sides by a pair of springs 136, 138. The spring 138 seats in a spring holder 140 that is threaded into a wall 142. The null position of the spool in the valve 128 is set with the swash plate 114 in neutral, as shown. Should the swash plate and the ultimate speed of the motor and the final drive need adjustment, the spring holder 140 may be adjusted to compensate for minor variations from the null position. Feedback linkage, indicated in its entirety by the reference numeral 144, extends from the swash plate 114 to the end of the balancing spring 136. Shifting of the spool in the valve 128 results in a pivoting of the swash plate 114. The position of the swash plate is fed back through the linkage to the arm 134 to vary the forces of springs 136, 138 on the arm. When the spring forces are balanced the spool in the valve 128 will be in a neutral position.

The motor portion 74 is controlled in substantially the same manner as the pump and the controls are generally a mirror image of the pump. The motor 74 includes the motor block 146 which has a series of cylinders angularly spaced around it which receive pistons 148. The motor contains a drive shaft, not shown, but which goes to the drive and eventually rotates the rotary drive member 22 and sprocket 26. The pistons engage a swash plate 150. The position of the swash plate 150 is controlled by a pair of cylinders 152, 154 which are fed fluid from a spindle valve 156. The spool in the valve 156 is controlled by the foot pedal 80 so as to permit fluid to move to opposite ends of the spindle for shifting it. As can be seen, lines 158, 160 extends from the valve 156 to the ends of the respective cylinders 152, 154. A pivoted arm 162 having its free end connected to the spool in the valve 156 is provided. Opposite sides of the arm 162 bear against springs 164, 166. The spring 164 sits in an adjustable spring holder 168 that may be adjusted in a wall 170. The arm 162 and the respective springs 164, 166 are not unlike the similar arrangement in the pump portion. A feedback linkage 172 extends from the swash plate 150 to the end of the spring 166. In operation, as the swash plate 150 is moved through operation of the control valve 78, fluid will be fed in a controlled manner to opposite ends of the spool valve 156. This will cause the arm 162 to shift to cause one of the springs 164, 166 to compress. The spring under compression will tend to move the arm 162 and the valve back to a neutral position. The balances obtained when a controlled pressure acting on one end of the spool of valve 156 plus the resultant force of the springs 164, 166 equals the force of the stronger of the two springs. Before departing from the brief description of the valve system for motor 74, it should be understood that any adjustment in the motor 74 of a small nature can occur through adjustment of the holder 168 to slightly increase or decrease the effective pressure of the stronger of the springs 164. Such adjustment is termed "phase adjustment". Also, there is provided in the hydraulic cylinders 152, 154 adjustable bolts 174 that extends into the cylinders and limits the amount of movement of the swash plate 150. This is an adjustment that is provided and is known as "gain adjustment". Reviewing FIG. 3, since the adjustable members 174 limits the movements of the pistons in motors 152, 154, they also limit the swash angle of the swash plate 150. Again, the specific features of the hydrostatic drive are not of great importance since other drives could be used. What is important, is the understanding that the present test fixture has its primary use in drives which have independent transmissions for the rotary drive members and which have adjustments in those transmissions to adjust the speed of one drive member relative to the other.

Referring now to the structure shown in FIG. 1 and FIG. 2, the tractor 10 is suspended above the floor where it is being assembled so that the rotary drives 22, 24 and their respective sprockets 26, 28 are above the floor. The main speed control valve 78 is set to drive the tractor drives 22, 24 at a predetermined rate of rotation. The encoders 56, 58 are mounted on the drives 22, 24 and/or their respective sprockets 26, 28 and readings are taken on the computer 60 to determine the difference in pulses that the two drives generate. This will be done on three different occasions at each speed of the main control valve. Prior to testing each tractor there are set limits that are acceptable with respect to the difference in RPM of the two drives 22, 24 and their sprockets 26, 28. If at a given speed these limits are not met, then adjustments of the spring holders 140, 168 and bolts 174 are made. For the slower speeds, adjustments will be in the null adjustment of the holder 140 and the phase adjustment controlled by the adjustable members 174. If at higher speeds the difference in speed of the drive shafts 22, 24 are outside the limits, adjustments are made almost predominately in the adjustable holder 168. After adjustments are made at a given speed, the unit is again tested to determine whether the difference in rotational speed of the drive members 22, 24 and sprockets 26, 28 fall within the required limits permitted. It should be understood that due to difference in tolerances and characteristics of respective drives, that it will always be expected that some side tracking will occur. However, if this is held within limits, it is acceptable to the manufacturer and the ultimate customer. In actual testing of a tractor, readings are taken at a number of speeds, both in forward and in reverse. Corrections in the null, phase, and gain adjustments as required are made for each speed.

The axle structure 32 is meant to represent a condition that is equivalent to the tractor tracks moving in relatively soft or moist conditions in which slippage of one or both tracks will occur. The axles 34, 36 are of course journaled by high quality bearings and consequently the axle structure would represent a condition similar to the worse conditions possible which is a very sandy or moist ground condition. The weight of the tractor also has a bearing on the amount of side tracking that might occur. In general the larger size tractors will have larger load characteristics bearing on side tracking than the smaller ones. This is due to the heavier tracks, the tractor weight, the increase frictional resistance within the joints of the tracks and movement over the sprockets and other resistances that are increased with the larger tractors. Consequently the dynamometer 54 is reset for substantially every basic size tractor to represent the increased or decreased load as the size of the tractor is increased or decreased.

I claim:

1. Test equipment for measuring the respective speeds of rotary drive members positioned on opposite sides of a tractor having independent transmissions for driving the respective drive members and including means in the transmissions for independently adjusting the respective speed of the drive members; said test equipment comprising: means supporting a tractor so that its drive members are suspended; a pair of axially aligned transverse drive shafts supported in offset relation but generally parallel to the axis of said tractor drive member; drive means connecting the tractor rotary drive members to the respective shafts for driving each of the shafts in direct proportion to the speed of its respective tractor drive members; an output drive shaft having one end adjacent the inner ends of the transverse drive shafts and the other end connected to a variable load device; a gear transmission drivingly connecting the inner ends of the drive shafts to said one end of the output shaft for driving the latter at a speed proportionate to the algebraic means of the speeds of the respective tractor drive members; and speed sensing devices measuring and displaying information relating to the speed of each of the tractor drive members, and comparing differences in speed of the drive members to acceptable ranges so as to advise the desirability of adjusting the respective transmissions to change one or both of the rotary members speed or rotation in order to fall within an acceptable range.

2. The invention defined in claim 1 in which the drive members on the tractor are chain sprockets, and said drive means includes sprockets mounted on the outer ends of the transverse drive shafts and a pair of chains extending between the sprockets on the tractor and the drive shafts for driving the latter in direct proportion as the speed of the former.

3. The invention defined in claim 1 in which the variable load device is adjustable to simulate the effects created by loads due to weights and characteristics of respective models and sizes of tractors.

4. Test equipment for measuring the respective speed of each rotary drive member on opposite sides of a tractor having independent hydrostatic transmissions for driving the respective drive members, each transmission including a hydraulic pump and associated hydraulic motor with means for independently adjusting the respective speed of its drive member, said test equipment comprising: means supporting a tractor so that its drive members are suspended; a pair of axially aligned, transverse drive shafts supported in offset relation but generally parallel to the axis of said tractor drive members; drive means connecting the tractor drive members to said drive shafts so as to drive the latter at speeds in direct proportion to the rotational speeds of the tractor drive members; an output drive shaft having one end adjacent the inner ends of the transverse drive shafts and the other end connected to a variable load device; a transmission drivingly connecting the inner ends of the drive shafts to said one end of the output shaft for driving the latter at a speed proportionate to the algebraic means of the speeds of the respective drive shafts; and speed sensors measuring the speed of each of the drive members and feeding the measurements to a device comparing differences in said speeds to acceptable ranges and displaying the results thereof.

5. The invention defined in claim 4 in which the rotary drive members on the tractor includes the axially aligned main output shafts extending to opposite sides of the tractor, the transverse drive shafts are parallel thereto and said drive means are a pair of chain drives, each extending between a respective drive member and a respective transverse drive shaft so that the latter is driven at a proportional speed to its drive member.

6. A method of correcting the speed of rotating drive members on opposite sides of a tractor in which the tractor has independent hydrostatic transmissions for driving the respective drive members with each transmission including a hydraulic pump and associated hydraulic motor with each pump and motor having means for adjusting the speed of the respective drive member, comprising the steps of:

suspending the drive members;

translating the speed of rotation of said drive members to a singular output rotating at a speed proportionate to the algebraic means of the speeds of said drive members;

resisting rotation of the output in an amount commensurate with a load on a tested tractor created by its own weight and driving characteristics;

driving and measuring the speed of each drive member at various tractor engine speeds;

comparing the differences in speed of the drive members with an acceptable range for each respective tractor engine speed; and making adjustments in the pump and/or motor of one or both transmissions so as to move the differences in speed of the drive members within the acceptable range.

* * * * *